(12) United States Patent
Walser et al.

(10) Patent No.: US 8,490,729 B2
(45) Date of Patent: Jul. 23, 2013

(54) MOTORIZED HUB FOR AN ELECTRIC TRACTION AUTOMOBILE VEHICLE

(75) Inventors: Daniel Walser, Villars-sur Glâne (CH); Patrick Marro, Givisiez (CH)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 198 days.

(21) Appl. No.: 12/937,027

(22) PCT Filed: Apr. 3, 2009

(86) PCT No.: PCT/EP2009/054039
§ 371 (c)(1),
(2), (4) Date: Feb. 1, 2011

(87) PCT Pub. No.: WO2009/124892
PCT Pub. Date: Oct. 15, 2009

(65) Prior Publication Data
US 2011/0115343 A1    May 19, 2011

(30) Foreign Application Priority Data
Apr. 11, 2008  (FR) ........................ 08 02010

(51) Int. Cl.
*B60K 7/00*  (2006.01)
(52) U.S. Cl.
USPC ..................... 180/65.51; 180/65.6

(58) Field of Classification Search
USPC ............ 180/65.51, 65.6; 310/66, 67 R, 75 R, 310/77
See application file for complete search history.

(56) References Cited

U.S. PATENT DOCUMENTS

| | | | |
|---|---|---|---|
| 6,257,604 B1 * | 7/2001 | Laurent et al. | 280/124.127 |
| 7,770,677 B2 * | 8/2010 | Takenaka | 180/65.51 |
| 8,037,957 B2 * | 10/2011 | Laurent | 180/65.51 |

FOREIGN PATENT DOCUMENTS

| | | |
|---|---|---|
| DE | 295 19 489 | 1/1996 |
| EP | 0 791 496 | 8/1997 |
| EP | 1 496 292 | 1/2005 |
| WO | WO 2007/022865 | 3/2007 |

* cited by examiner

*Primary Examiner* — John Walters
(74) *Attorney, Agent, or Firm* — Cozen O'Connor (57) ABSTRACT

A motorized hub (1) for an electric traction automobile vehicle, said motorized hub comprising a hub (9) adapted to receive a wheel (2), the hub being mounted to rotate relative to a hub-carrier (7) about a hub axis. The motorized hub comprises a traction electric machine having an external stator (32) fastened to the hub-carrier and an internal rotor (31) the rotation axis of which is spaced from the hub axis and parallel to said hub axis. The motorized hub comprises reduction means (6) operating between the rotor of the electric machine and the hub, and friction braking means, the brake rotor (5) being fastened to the hub and disposed axially on the vehicle interior side relative to the reduction means. The shaft of the rotor (31) of the electric machine being placed radially outside the brake rotor and extending axially from the reduction means toward the interior of the vehicle.

16 Claims, 8 Drawing Sheets

MOTORIZED HUB FOR AN ELECTRIC TRACTION AUTOMOBILE VEHICLE

RELATED APPLICATIONS

This is a U.S. national stage of application No. PCT/EP2009/054039, filed on Apr. 3, 2009.

This patent application claims the priority of French patent application Ser. No. 08/02010 filed Apr. 11, 2008, the disclosure content of which is hereby incorporated by reference.

FIELD OF THE INVENTION

The present invention concerns the connection to the ground of electric traction automobile vehicles, in particular the motorized wheels thereof.

BACKGROUND OF THE INVENTION

In this field there are known a number of proposals such as those of the documents EP 0878332, WO 2006/032669, US 2007/0257570 and WO 2007/083209.

In the present application, the expression "motorized hub" is used to designate the mechanical assembly comprising the hub, the hub-carrier, the system for guiding the hub relative to the hub-carrier, the electric motorization and the braking means of the hub. The motorized hub is thus intended on the one hand to receive a wheel equipped for example with a tyre and on the other hand to carry a vehicle, generally via suspension means. In the present application, the expression "motorized wheel" is also used to designate the mechanical assembly comprising the motorized hub defined above and the corresponding wheel.

One of the difficulties with adopting such motorized hubs on mass-produced vehicles is backward compatibility with solutions already adopted and validated by manufacturers for some components such as suspension systems and wheels. Another difficulty is obtaining a compact and simple system that is as light as possible in order to render the cost acceptable to the automobile industry.

In particular, integrating electric motors in the wheels is particularly desirable because the adoption of electric traction often entails the necessity of carrying batteries to store electrical energy which, even with the best performing technologies known at present, makes it obligatory to devote a sufficient volume to the batteries on board the vehicle unless the range of an electric vehicle is enormously reduced. Similar reasoning may be applied in the case of fuel cell vehicles.

Moreover, if it is wished to be able to develop a sufficient traction torque, it proves necessary to install reduction means because it is not possible, with a sufficiently compact electric motor, to develop a torque appropriate to drive a motor car directly.

Finally, it is generally necessary to be able to integrate into the wheel not only the electric motor and the associated reduction means but also a mechanical braking device (disc or drum brake).

In most known arrangements, the disc or the drum and the electric motor are concentric with the wheel.

Although interior rotor motor configurations where the motor axis is offset relative to the axis of the wheel to enable a reduction stage to be installed between the axle of the wheel and the rotor of the electric motor would seem to have the only benefit of installing a sliding system providing the suspension of the wheel also integrated into the wheel, the applicant has noticed that sufficient space may be freed up to install a brake disc or drum radially inside the shaft of the motor and axially on the vehicle interior side relative to the reduction means.

This represents a good compromise, given in particular that a portion of the braking torque may be provided by electrical means.

SUMMARY OF THE INVENTION

One aspect of the invention is directed to a motorized hub for an electric traction automobile vehicle, said motorized hub comprising a hub adapted to receive a wheel, the hub being mounted to rotate relative to a hub-carrier about a hub axis, the motorized hub comprising a traction electric machine, the electric machine comprising an external stator fastened to the hub-carrier and an internal rotor the rotation axis of which is spaced from the hub axis and parallel to said hub axis, the motorized hub comprising reduction means operating between the rotor of the electric machine and the hub, the motorized hub further comprising friction braking means, the brake rotor being fastened to the hub and disposed axially on the vehicle interior side relative to the reduction means, the shaft of the rotor of the electric machine being placed radially outside the brake rotor and extending axially from the reduction means toward the interior of the vehicle.

The hub is preferably guided in rotation relative to the hub-carrier by hub bearings, the brake rotor being disposed axially on the vehicle interior side relative to the hub bearings.

The reduction means are preferably reversible.

The reduction means preferably comprise a single reduction stage consisting of a toothed ring fastened to the hub and a drive gear fastened to the rotor of the electric machine and meshing with the toothed ring.

The brake rotor is preferably a disc.

In a first embodiment of the invention, the median plane of the brake rotor intersects the stator of the electric machine and the electric machine is placed radially outside the brake rotor. The brake rotor and the electric machine are preferably within the inside diameter of the wheel. The brake rotor is preferably fastened to the hub by means of a splined shaft passing through the hub, the splined shaft also axially clamping the hub bearings.

The hub is preferably fastened to the interior part of the hub bearings and the hub-carrier is preferably fastened to the exterior part of said bearings. The hub-carrier preferably further constitutes a casing enclosing the reduction means.

In a second embodiment of the invention, the hub-carrier is in contrast inside the hub and constitutes a stub axle fastened to the interior part of the hub bearings, the hub being fastened to the exterior part of the hub bearings. A casing is mounted to rotate about the hub. The casing is preferably prevented from rotating relative to the stub axle and preferably supports the stator of the electric machine.

In a third embodiment of the invention, the whole of the stator of the electric machine is positioned axially outside the wheel toward the interior of the vehicle. A bush disposed between the stator of the electric machine and the hub-carrier preferably supports said stator, the drive gear axially extending the rotor of the electric machine through said bush. The brake rotor is preferably placed facing the bush.

The bush preferably also guides the drive gear via gear bearings and the hub-carrier preferably also constitutes a casing enclosing the reduction means.

In a fourth embodiment of the invention, a casing enclosing the reduction means is fastened to the hub-carrier, the drive gear being guided relative to the hub-carrier by gear bearings fastened to said casing. The drive gear is preferably also guided by a bearing fastened to a cover of the casing, said bearing being situated axially outside the toothed ring relative to the electric machine.

According to an embodiment of the invention, the motorized hub further comprises a reservoir of lubricant for the reduction means using at least one protuberance situated in a lower part of the casing.

Another aspect of the invention concerns a motorized wheel comprising a motorized hub according to any of the preceding claims. The motorized wheel preferably comprises a conventional one-piece wheel, preferably in sheet steel.

Another aspect of the invention concerns a vehicle comprising at least two such motorized wheels. Two motorized wheels are preferably disposed on the rear axle of said vehicle, the hub-carriers of two motorized wheels being each attached to a trailing arm of the rear axle.

DETAILED DESCRIPTION OF THE INVENTION

In all the figures, identical or similar elements carry the same reference. Their description is therefore not systematically repeated.

Figure 1:
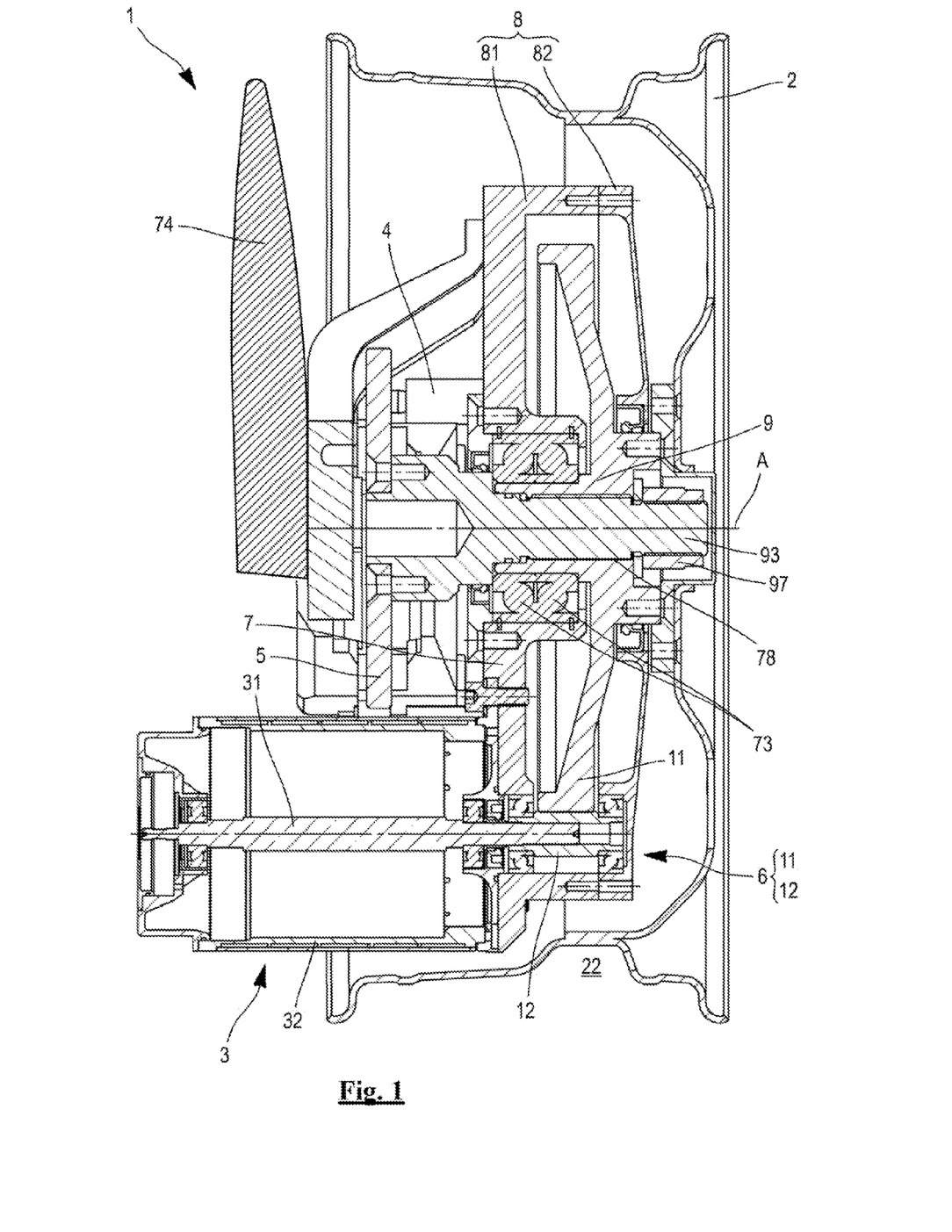
FIG. 1: view in section taken along the line B-B in FIG. 2 passing through the axis of the hub of a first embodiment of the invention.

FIG. 1 represents a motorized hub 1 of a first embodiment of the invention. The motorized hub 1 is intended to guide and control the rotation of a wheel 2. The tyre has been omitted in this figure. A hub 9, intended to receive the wheel 2, is mounted to rotate relative to a hub-carrier 7 about a hub axis A.

The hub axis (which is therefore also the rotation axis of the wheel) is a constant reference in the present application; it is relative to this axis A that an orientation is described as "radial" or "axial". As a reminder and as used in the field of tyres and wheels, an axial orientation is an orientation parallel to the axis of the hub and a radial orientation is an orientation perpendicular to the axis of the hub.

The hub bearings 73 are axially clamped to the hub 9 by a wheel axle 93 receiving a nut 97 at its exterior end (on the right in FIG. 1). The outer part of the hub bearings is fixed (fastened to the hub-carrier 7) and the interior part turns with the hub 9. The hub-carrier is external to the hub.

An electric machine 3 drives and where applicable brakes the wheel via reduction means 6. To simplify the drawing of the electric machine, there are represented only the external sheath of the stator 32, its ends and the motor axle 31 and its guide means.

The rotation axis of the rotor of the electric machine is parallel to and spaced from the axis of the hub. The stator 32 of the electric machine is fastened to the hub-carrier. The reduction means 6 comprise a toothed ring 11 fastened to the hub 9 and a gear 12 connected to the motor shaft 31 of the electric machine 3. A casing 8 protects the reduction means. Here the hub-carrier constitutes a main part 81 of the casing that is completed by a cover 82. The friction braking means comprise a brake rotor (disc 5) and a braking stator (calliper 4). The disc is fastened to the hub by the wheel axle 93. The wheel axle 93 and the hub 9 are blocked against relative rotation, preferably by corresponding splines 78. The median plane of the brake rotor thus intersects the stator of the electric machine. The brake calliper 4 is fastened to the hub-carrier. The brake rotor is situated axially inside the vehicle relative to the hub-carrier and its outside diameter is preferably very small in order to be able also to accommodate the electric machine 3 (to be more precise its stator 32) radially inside the wheel 2 and outside the brake rotor (here the disc 5). This preferred aspect of the invention is clearly visible in FIG. 2. The wheel represented here is a conventional sheet steel one-piece wheel of 16 inches diameter.

Figure 2:
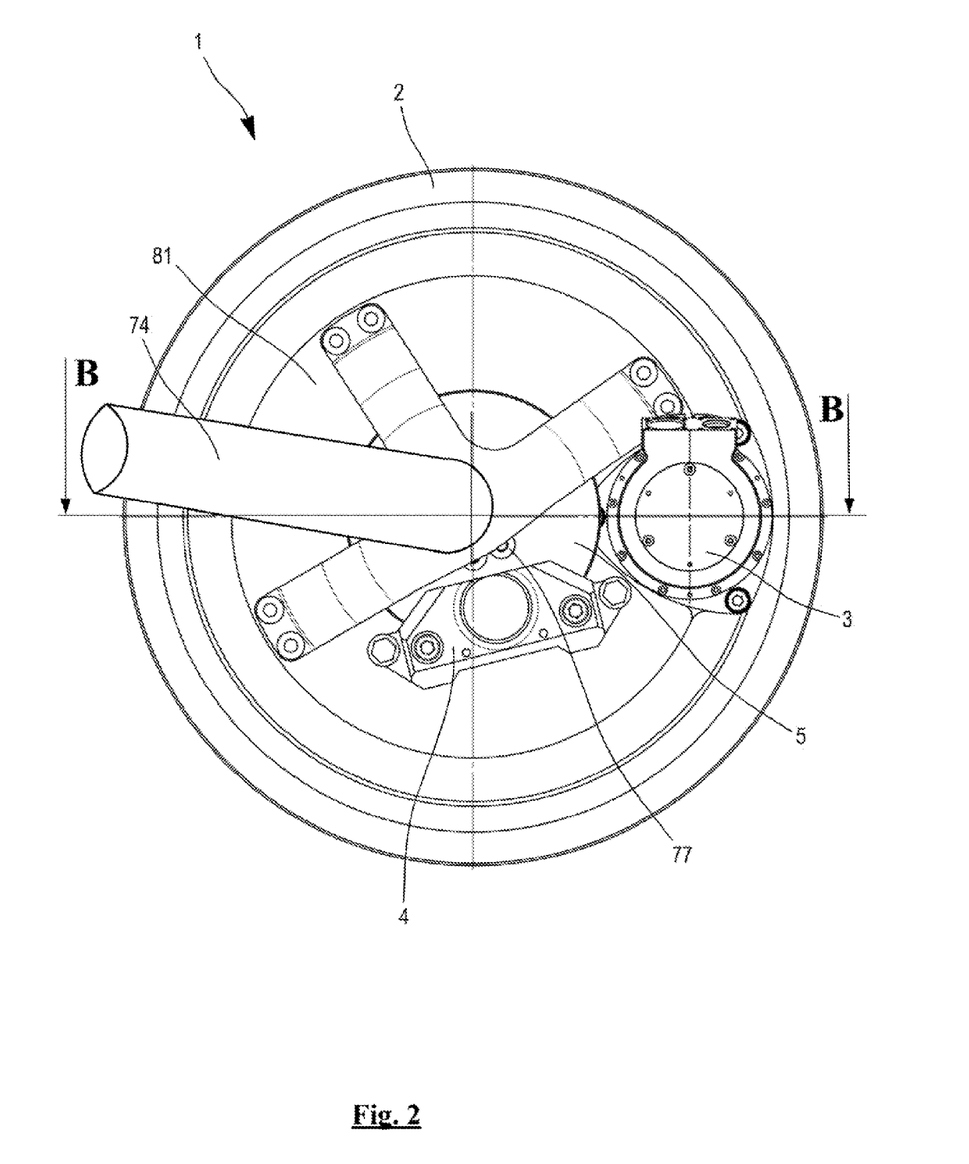
FIG. 2: side view of the first embodiment of the invention.

The motorized wheel of this first embodiment is preferably fixed directly to the suspension members of the vehicle, for example to a trailing arm of a rear axle as indicated diagrammatically in FIG. 2 where it is seen that the trailing arm 74 is fastened to the casing 81 and therefore to the hub-carrier.

Figure 3:
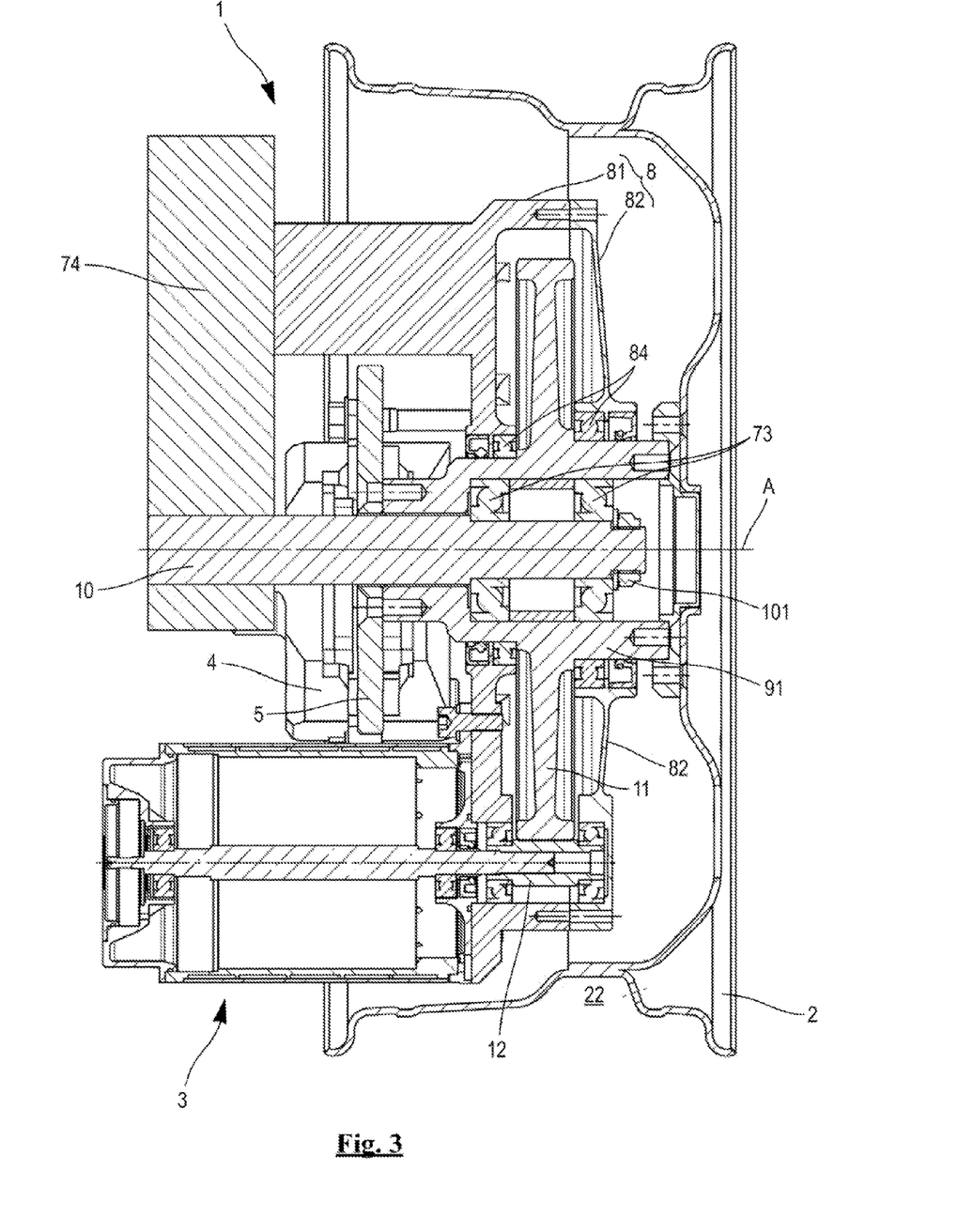
FIG. 3: sectional view similar to FIG. 1 of a second embodiment of the invention.

FIG. 3 represents a motorized hub of a second embodiment of the invention. An essential difference compared to the first embodiment is that the hub-carrier here consists of a stub axle 10 around which the hub 91 turns. The hub-carrier is therefore inside the hub. The hub is mounted on the stub axle by means of bearings 83 the exterior part of which therefore turns whereas the interior part is fixed, i.e. in a configuration reversed relative to the FIG. 1 arrangement. The hub bearings are axially clamped to the stub axle by a stub axle nut 101 at its exterior end (on the right in FIG. 3). The hub being held from the inside, the casing 8 of the reduction means no longer participates in guiding the wheel as in the FIG. 1 embodiment but retains its function of guiding the electric machine 3 and the drive gear 12. The casing (an assembly of two complementary parts 81 and 82) is mounted to turn on the hub by means of bearings 84 and it is prevented from rotating relative to the stub axle by anti-rotation means that connect it directly or indirectly to the stub axle 10 or to the trailing aim 74 to which the stub axle is fixed. The wheel represented here is a conventional sheet steel one-piece wheel of 17 inches diameter. The tyre has been omitted.

Figure 4:
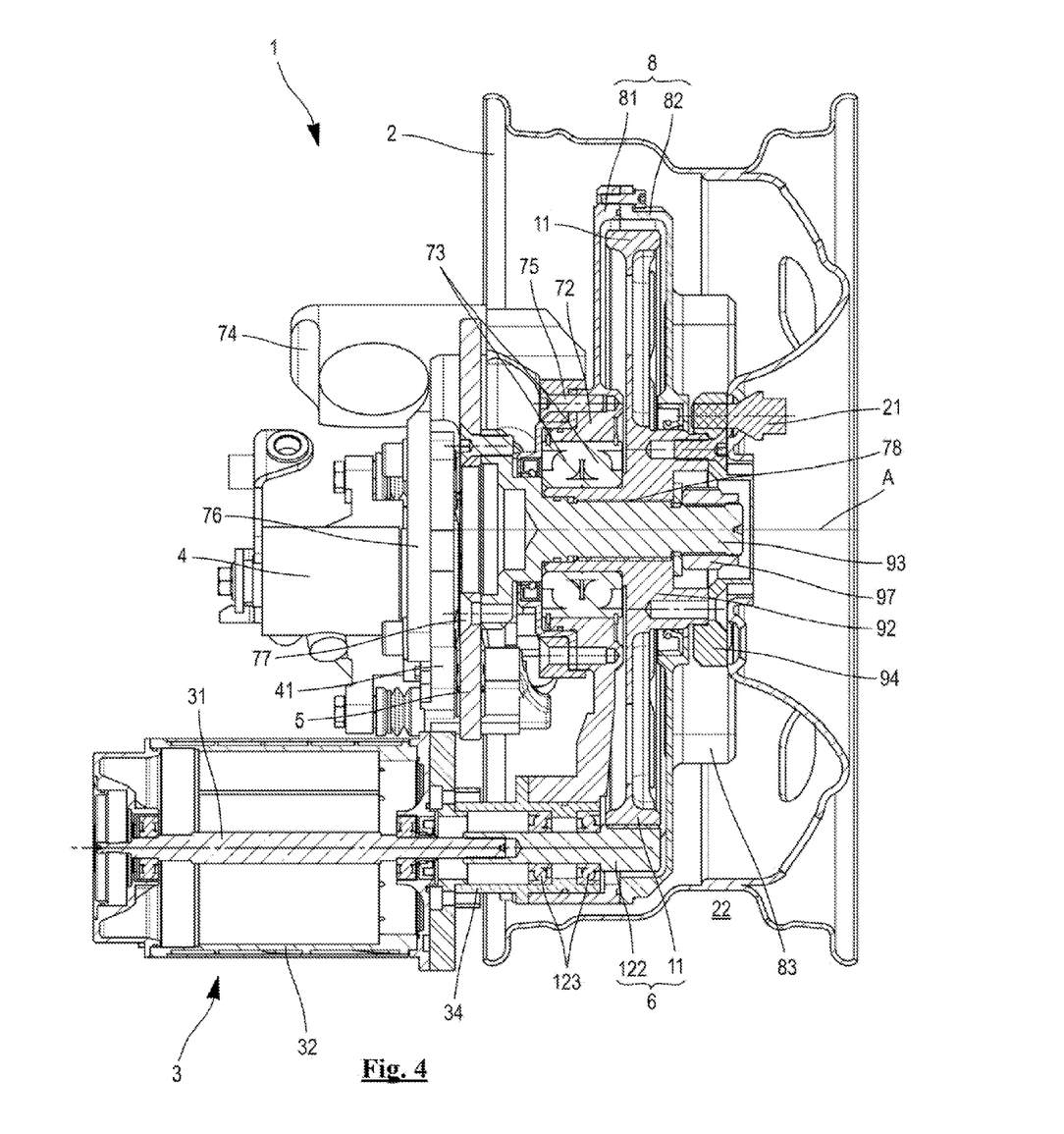
FIG. 4: view in section taken along the line B-B in FIG. 5 passing through the axis of the hub of a third embodiment of the invention.
Figure 5:
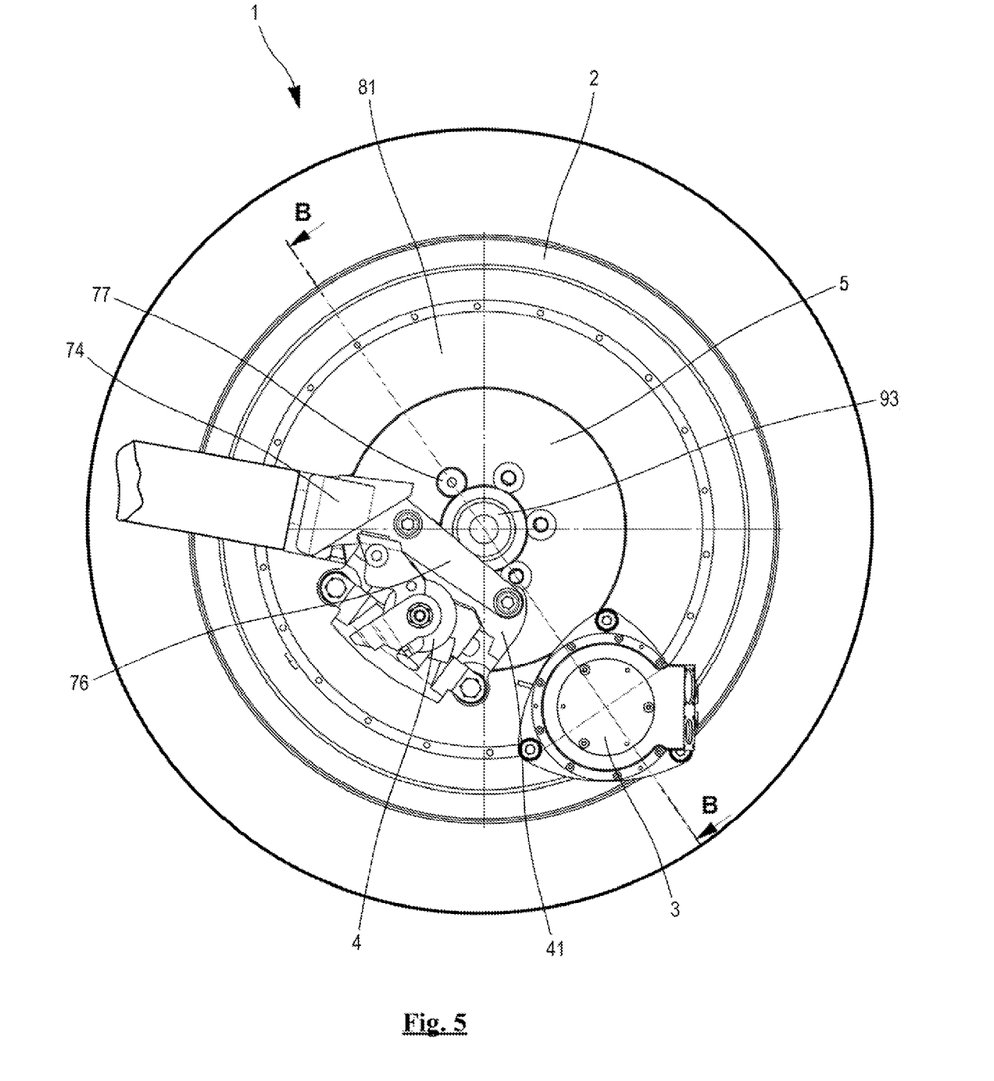
FIG. 5: side view of the third embodiment of the invention.

FIGS. 4 and 5 represent a third embodiment of the invention which is essentially similar to the first embodiment shown in FIGS. 1 and 2 except with regard to the relative positions of the electric machine 3, the wheel 2, and the brake disc 5. In particular the electric machine 3 is here offset axially toward the interior of the vehicle so that its stator is entirely outside the wheel 2.

In FIG. 4, it is clearly seen that the hub-carrier 72 guides the hub 92 via the bearing 73 the inner race of which turns and the outer race of which is fixed as in the arrangement described with reference to FIG. 1. The hub-carrier 72 also constitutes the interior part of the casing 8 protecting the reduction means 6. The hub-carrier further supports the fixing system of the electric machine but instead of the electric machine being fixed directly to the casing as in FIG. 1, here the electric machine is offset toward the interior of the vehicle by means of a bush 34 receiving and also guiding the drive gear 122 (see bearings 123). This configuration in particular makes it possible to increase the reduction ratio by accommodating a toothed ring 11 of greater diameter because it is no longer positioned facing the hollow side of the rim 22 and the bearings guiding the drive gear 122 are also spaced away from it. This offset electric machine configuration is therefore of increasing benefit as the wheel diameter decreases. The brake disc 5 may then be placed facing the bush 34 and not facing the stator of the electric machine, which allows a greater disc diameter. The disc is therefore positioned axially between the stator 32 of the electric machine and the reduction means 6. The median plane of the brake rotor therefore no longer intersects the stator of the electric machine. The hub-carrier 72 is fixed to the suspension system of the vehicle, i.e. here to the end of the trailing arm 74, by means of screws 75.

The hub bearings 73 are axially clamped onto the hub 92 by the wheel axle 93 receiving the nut 97 at its exterior end (on the right in FIG. 4). The brake disc 5 is fixed by bolts 77 to the interior end (on the left in the figure) of the wheel axle 93. Splines 78 prevent all rotation of the wheel axle in the hub with the result that the disc is fastened to the hub and thus the wheel 2. The bracket 41 of the brake calliper 4 is fixed to a bracket support 76 on the trailing arm 74. The cover 82 of the casing comprises a protuberance 83 in its lower part in order to constitute a lubricant reservoir of adequate capacity. A flange 94 is fixed to the exterior end of the hub and receives the wheel 2 fixed by bolts 21. A different wheel could naturally be fixed directly to the hub 92 without using the flange but the system represented here has the advantage of accommodating entirely conventional wheels and wheel studs. The wheel represented here is a standard one-piece sheet steel wheel of 15 inches diameter (6J15-ET27).

Figure 6:
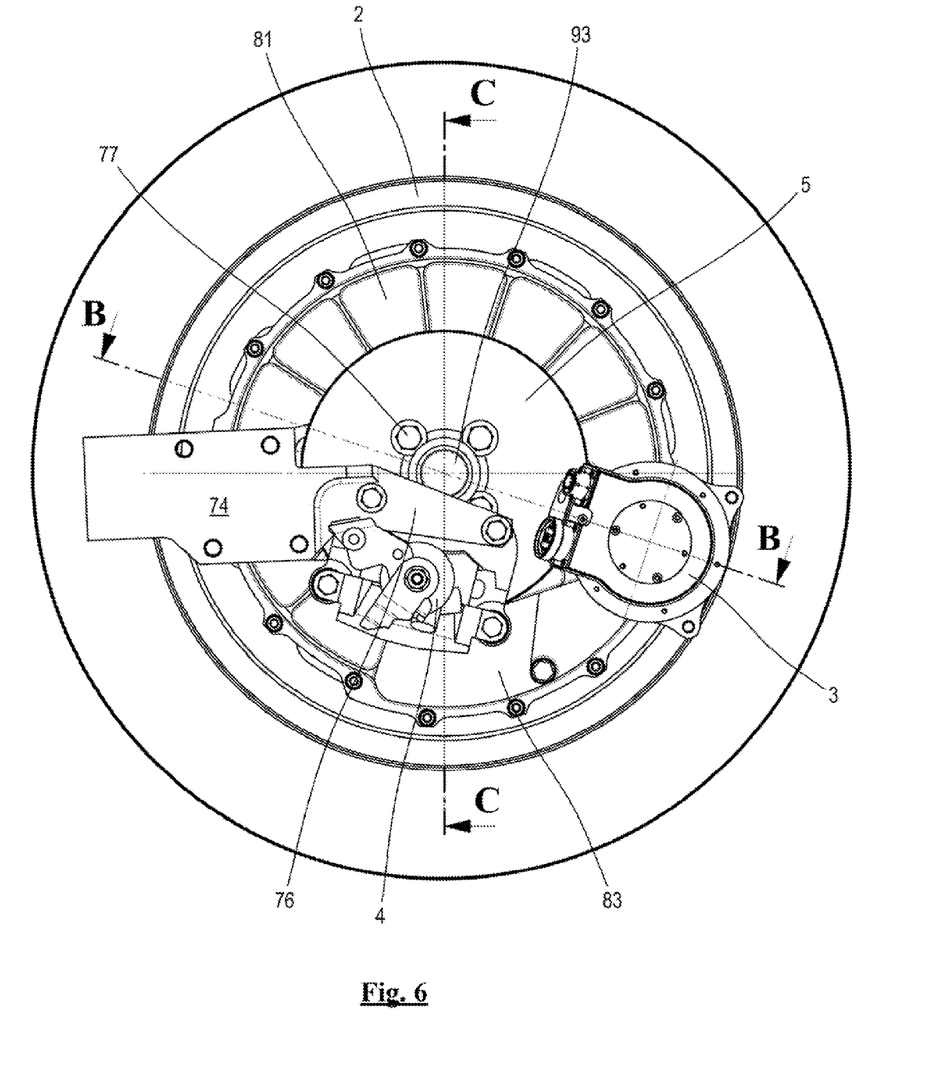
FIG. 6: side view of a fourth embodiment of the invention.
Figure 7:
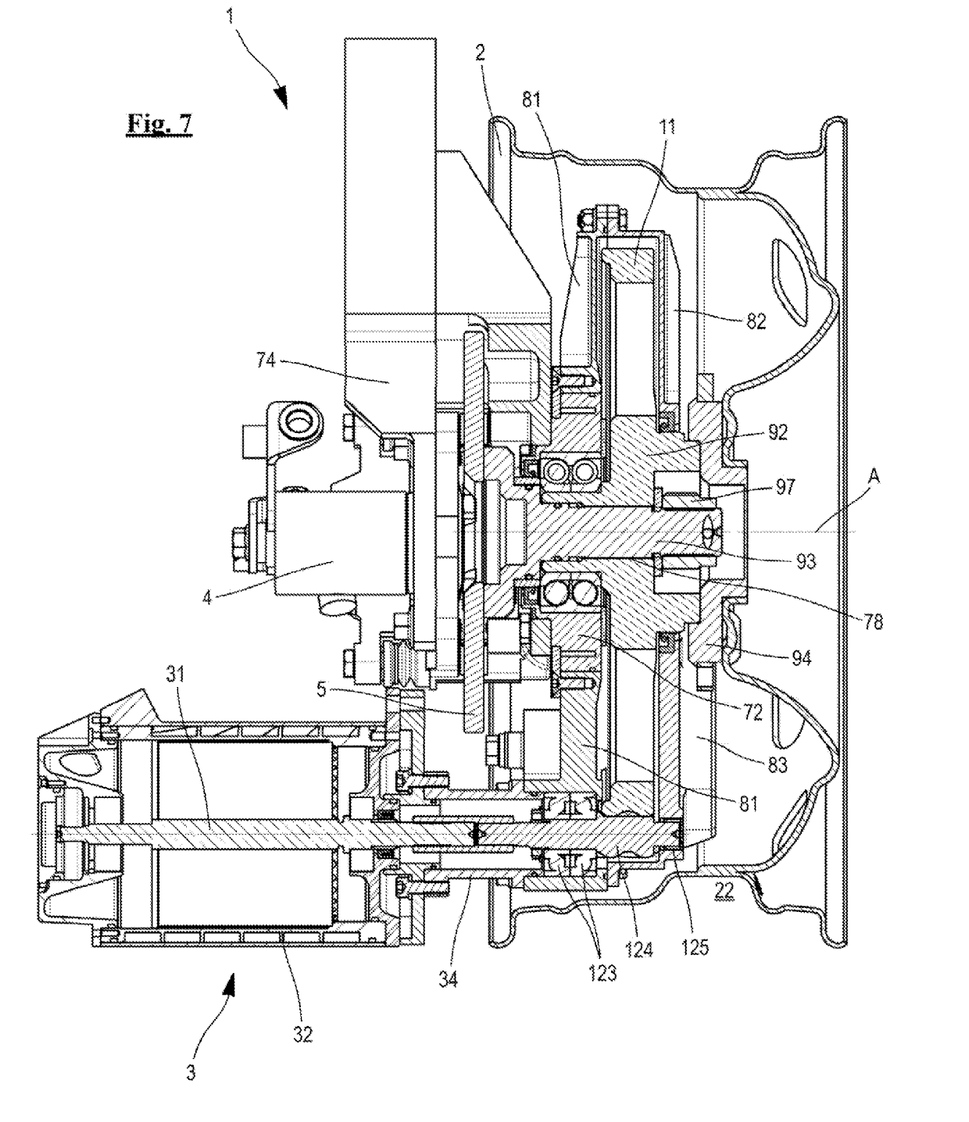
FIG. 7: view in section taken along the line B-B in FIG. 6 passing through the axis of the hub of the fourth embodiment of the invention.
Figure 8:
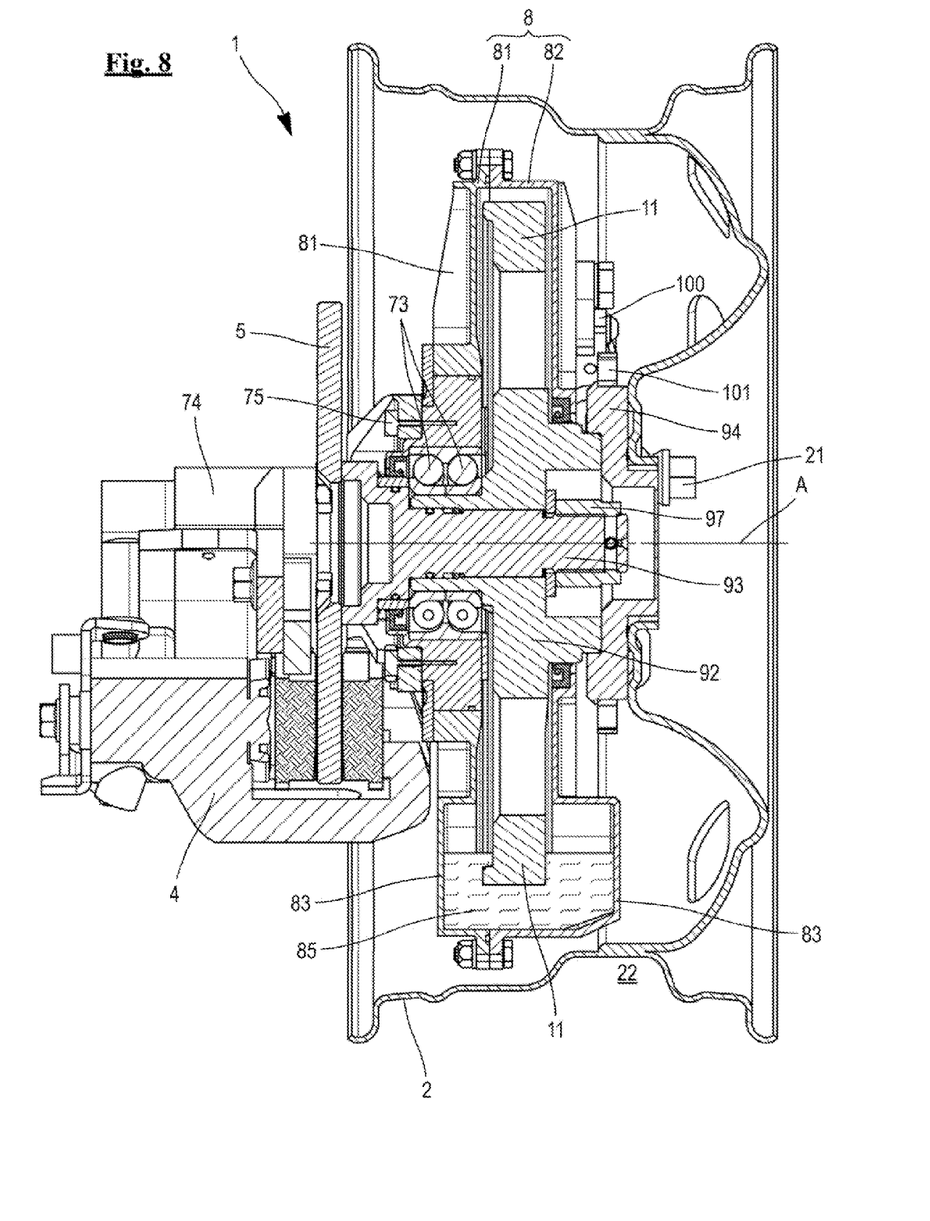
FIG. 8: view in section taken along the line C-C in FIG. 6 passing through the axis of the hub of the fourth embodiment of the invention.

FIGS. 6 to 8 represent a fourth embodiment of the invention similar to that of FIGS. 4 and 5. This embodiment uses the same standard 15-inch diameter wheel. The main differences concern the guidance of the drive gear and the separation of the hub-carrier and the casing.

Here the gear bearings 123 are carried directly by the casing, the bush 34 serving only to maintain the bearing in its axial position. The drive gear 124 is extended beyond its meshing with the ring 11 in order to be further guided by an additional bearing (needle cage 125) carried by the cover 82 of the casing.

The interior part 81 of the casing 8 is no longer in one piece with the hub-carrier 72 but here these two parts are assembled by bolts 86. An advantage of this separation is that it is then possible to choose different materials for the hub-carrier and the casing, for example steel and an aluminium alloy, respectively.

The electric machine 3 is even further offset toward the interior of the vehicle with the result that the brake disc 5 may extend further in the radial direction into the space freed up between the electric machine and the casing.

In FIG. 8 in particular there is clearly seen the lubricant reservoir 85 created at the bottom of the casing by the protuberances 83 on the interior part 81 and the exterior part 82 of the casing.

There is furthermore shown an ABS sensor 100 carried by the cover 82 and positioned facing an ABS ring 101 carried by the flange 94.

Only one electric machine is shown in the various figures. Naturally, the invention provides for using two or more machines on each hub, the machines each meshing via their own drive gear with a single ring 11. With multiple motors it is possible to increase the available torque and/or to reduce the axial and radial dimensions of the electric machines.

In all variants, the hub-carrier and the trailing arm (or only part of the arm) may be manufactured in one piece instead of being bolted together as shown most often here.

Similarly, a single disc brake has been systematically shown. This is a preferred embodiment but the person skilled in the at knows that in some situations it may be preferable to use a drum brake instead of the disc brake.

Regardless of the embodiment of the invention, the reduction means are preferably reversible in order to enable use of the electric machine in braking mode. The electrical energy recovered by the electric machine in braking mode may be stored or dissipated in a manner known in itself.

An essential feature of the motorized hubs of the invention is the choice that has been made of an internal rotor electric machine the rotation axis of which is spaced from the hub axis and parallel to said hub axis, i.e. non-concentric. The configuration of the invention makes it possible to obtain a sufficient reduction ratio with a single gear, i.e. with a single reduction stage. The reduction ratio of the embodiment shown here is of the order of 15.

The invention claimed is:

1. A motorized hub for an electric traction automobile vehicle, said motorized hub comprising a hub adapted to receive a wheel, the hub being mounted to rotate relative to a hub-carrier about a hub axis, the motorized hub comprising a traction electric machine, the electric machine comprising an external stator fastened to the hub-carrier and an internal rotor the rotation axis of which is spaced from the hub axis and parallel to said hub axis, the motorized hub comprising reduction means operating between the rotor of the electric machine and the hub, the motorized hub further comprising friction braking means, a brake rotor being fastened to the hub and disposed axially on the vehicle interior side relative to the reduction means, a shaft of the rotor of the electric machine being placed radially outside the brake rotor and extending axially from the reduction means toward the interior of the vehicle.

2. The motorized hub according to claim 1, wherein the hub is guided in rotation relative to the hub-carrier by hub bearings, the brake rotor being disposed axially on the vehicle interior side relative to the hub bearings.

3. The motorized hub according to claim 1, wherein the reduction means comprise a single reduction stage consisting of a toothed ring fastened to the hub and a drive gear fastened to the rotor of the electric machine and meshing with the toothed ring.

4. The motorized hub according to claim 1, wherein the brake rotor is a disc, the median plane of the disc intersecting the stator of the electric machine.

5. The motorized hub according to claim 1, wherein the electric machine is placed radially outside the brake rotor.

6. The motorized hub according to claim 5, wherein the brake rotor and the electric machine are within an inside diameter of the wheel.

7. The motorized hub according to claim 1, wherein the brake rotor is fastened to the hub by means of a splined shaft passing through the hub, the splined shaft also axially clamping hub bearings.

8. The motorized hub according to claim 1, wherein the hub is fastened to an interior part of hub bearings and the hub-carrier is fastened to the exterior part of said hub bearings.

9. The motorized hub according to claim 1, wherein the hub-carrier is inside the hub and constitutes a stub axle fastened to the interior part of hub bearings, the hub being fastened to the exterior part of the hub bearings.

10. The motorized hub according to claim 9, wherein a casing is mounted to rotate about the hub, and wherein the casing is prevented from rotating relative to the stub axle and supports the stator of the electric machine.

11. The motorized hub according to claim 1, wherein the whole of the stator of the electric machine is positioned axially outside the wheel toward the interior of the vehicle.

12. The motorized hub according to claim 11, wherein the brake rotor is radially outside the radially innermost part of the stator of the electric machine, the brake rotor being placed axially between the stator of the electric machine and the reduction means.

13. The motorized hub according to claim 1, having a casing enclosing the reduction means, said motorized hub also comprising a reservoir of lubricant for the reduction means using at least one protuberance situated in a lower part of the casing.

14. A motorized wheel comprising the motorized hub according to claim 1.

15. A vehicle comprising at least two motorized wheels according to claim 14.

16. The vehicle according to claim 15, wherein two motorized wheels are disposed on the rear axle of said vehicle, the hub-carriers of the two motorized wheels being each fastened to a trailing arm of the rear axle.

\* \* \* \* \*